United States Patent
Friedman et al.

(10) Patent No.: US 7,320,809 B2
(45) Date of Patent: Jan. 22, 2008

(54) COOKING OIL ANTIOXIDANT COMPOSITION, METHOD OF PREPARATION AND USE

(75) Inventors: Bernard Friedman, Allentown, PA (US); Barbara A. Bielska, Allentown, PA (US)

(73) Assignee: Oil Processing Systems, Inc., Allentown, PA (US)

( * ) Notice: Subject to any disclaimer, the term of this patent is extended or adjusted under 35 U.S.C. 154(b) by 39 days.

(21) Appl. No.: 10/395,314

(22) Filed: Mar. 24, 2003

(65) Prior Publication Data

US 2003/0180424 A1 Sep. 25, 2003

Related U.S. Application Data

(60) Provisional application No. 60/367,072, filed on Mar. 22, 2002.

(51) Int. Cl.
A23L 1/48 (2006.01)
(52) U.S. Cl. .................. 426/541; 426/542; 426/438
(58) Field of Classification Search ............ 426/330.6, 426/438, 262, 268, 541, 602, 654
See application file for complete search history.

(56) References Cited

U.S. PATENT DOCUMENTS

| | | | |
|---|---|---|---|
| 3,623,888 A * | 11/1971 | Reid ..................... 426/330.6 |
| 3,873,466 A | 3/1975 | Wright |
| 3,947,602 A | 3/1976 | Clewell, Jr. et al. |
| 3,950,266 A | 4/1976 | Chang et al. |
| 4,115,597 A * | 9/1978 | Pellar ..................... 426/541 |
| 4,330,564 A | 5/1982 | Friedman |
| 4,349,353 A | 9/1982 | Blumenthal et al. |
| 4,349,451 A | 9/1982 | Friedman |
| 4,359,482 A * | 11/1982 | Crosby ..................... 426/606 |
| 4,363,823 A | 12/1982 | Kimura et al. |
| 4,462,915 A | 7/1984 | Friedman |
| 4,731,332 A | 3/1988 | Blumenthal et al. |
| 4,806,374 A | 2/1989 | Willemse |
| 4,880,652 A | 11/1989 | Regutti |
| 4,968,518 A | 11/1990 | Lopez |
| 5,068,115 A | 11/1991 | Liebermann |
| 5,077,069 A | 12/1991 | Chang et al. |
| 5,084,289 A | 1/1992 | Shin et al. |
| 5,139,803 A | 8/1992 | Haynes et al. |
| 5,169,669 A | 12/1992 | Haynes et al. |
| 5,194,270 A | 3/1993 | Cante et al. |
| 5,200,224 A | 4/1993 | Friedman |
| 5,219,602 A | 6/1993 | Saleeb et al. |
| 5,230,916 A | 7/1993 | Chang et al. |
| 5,258,190 A | 11/1993 | Cante et al. |
| 5,296,249 A * | 3/1994 | Todd, Jr. .................... 426/541 |
| 5,348,755 A * | 9/1994 | Roy ........................... 426/541 |
| 5,354,570 A | 10/1994 | Friedman |
| 5,498,434 A | 3/1996 | Johnston |
| 5,552,167 A | 9/1996 | Taylor et al. |
| 5,780,095 A * | 7/1998 | Jackeschky .................. 426/614 |
| 5,855,944 A * | 1/1999 | Koschinski et al. ......... 426/541 |
| 5,912,041 A * | 6/1999 | Covington et al. .......... 426/606 |
| 6,007,856 A | 12/1999 | Cox et al. |
| 6,013,255 A | 1/2000 | Edens et al. |
| 6,017,558 A | 1/2000 | Bertholet |
| 6,106,879 A * | 8/2000 | Mori et al. .................. 426/438 |
| 6,177,120 B1 * | 1/2001 | Jackeschky .................. 426/614 |
| 6,187,355 B1 | 2/2001 | Akoh et al. |
| 6,210,732 B1 | 4/2001 | Papanton |
| 6,358,554 B1 | 3/2002 | Hagiwara et al. |
| 6,365,211 B1 | 4/2002 | Corrigan |

FOREIGN PATENT DOCUMENTS

| | | |
|---|---|---|
| EP | 1186648 | 3/2003 |
| RU | 2067112 | 9/1996 |
| WO | 88/07821 | 10/1988 |
| WO | 00/077133 | 12/2000 |

OTHER PUBLICATIONS

FSTA Abstract 1985(07):N0024.*
FSTA Abstract 2000(06):N0336.*
FSTA Abstract 1976(04):N0155.*
FSTA Abstract 2000(09):N0501.*
FSTA 1984(03):N0133.*
FSTA 1995(10): N0045.*
Jaswir, I et al. 2000. JAOCS 77(11)1161-1168.*
Jaswir, I et al. 2000. JAOCS 77(5)527-533.*
Man, Y. B. Che et al. 1999. JAOCS 76(3)331-339.*
Pruthi, J.S. 1980. Spices and Condiments: Chemistry, Microbiology, Technology, Academic Press, New York, p. 19, 136, 137.*

(Continued)

*Primary Examiner*—Carolyn Paden
(74) *Attorney, Agent, or Firm*—Lerner, David, Littenberg, Krumholz & Mentlik, LLP

(57) ABSTRACT

Frying processes utilizing cooking oil at elevated temperatures can cause various degradation effects in the oil including oxidation, hydrolysis and/or polymerization. In the absence of additives to protect the oil, the nutritional profile and cooking performance of degraded oil diminishes the quality of food cooked therein. The disclosed methods and compositions provide beneficial and cost effective improvements in the cooking performance of oil used at elevated temperatures, for example, in food frying equipment.

24 Claims, 6 Drawing Sheets

OTHER PUBLICATIONS

C.W. Fritsch, Measurements of Frying Fat Deterioration: A Brief Review, General Mills, Inc., James Ford Bell Technologies Center.

Christian Gertz, Sabine Kiostermann, S. Parkash Kochhar, Testing and Comparing Oxidative Stability Of Vegetable Oils And Fats At Frying Temperature, Wiley-VCH Verlag GmbH, 69451 Weinhem, 2000.

Adsorbent antioxidant provides optimum frying in restaurant and fast food fryers, Eur. J. Lipid Sci. Technol. 102 (2000) 560-565.

B. Friedman, Fat and Cholesterol Reduced Foods Technologies and Strategies, New Control of Frying Process Provides Major Reduction of Oil in Food, Advances in Applied Biotechnology Series, vol. 12, pp. 141-152.

The Merck Index, An Encyclopedia of Chemicals and Drugs, Ninth Edition (1976), Entry 1531 and 1532, pp. 197-198.

Supplementary European Search Report, Dated Apr. 21, 2006, EP 03 72 6108.

Adsorbent antioxidant provides optimum frying in restaurant and fast food fryers, Eur. J. Lipid Sci. Technol. 102 (2000) 560-565.

B. Friedman, Fat and Cholesterol Reduced Foods Technologies and Strategies, New Control of Frying Process Provides Major Reduction of Oil in Food, Advances in Applied Biotechnology Series, vol. 12, pp. 141-152.

The Merck Index, An Encyclopedia of Chemical and Drugs, Ninth Edition (1976), Entry 1531 and 1532, pp. 197-198.

* cited by examiner

FIG. 2
FIG. 3
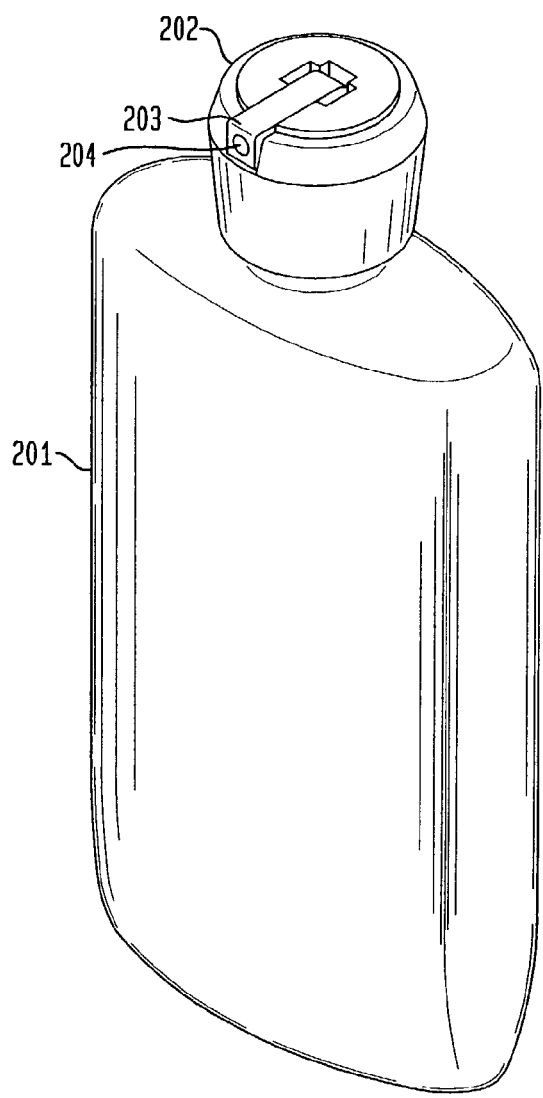
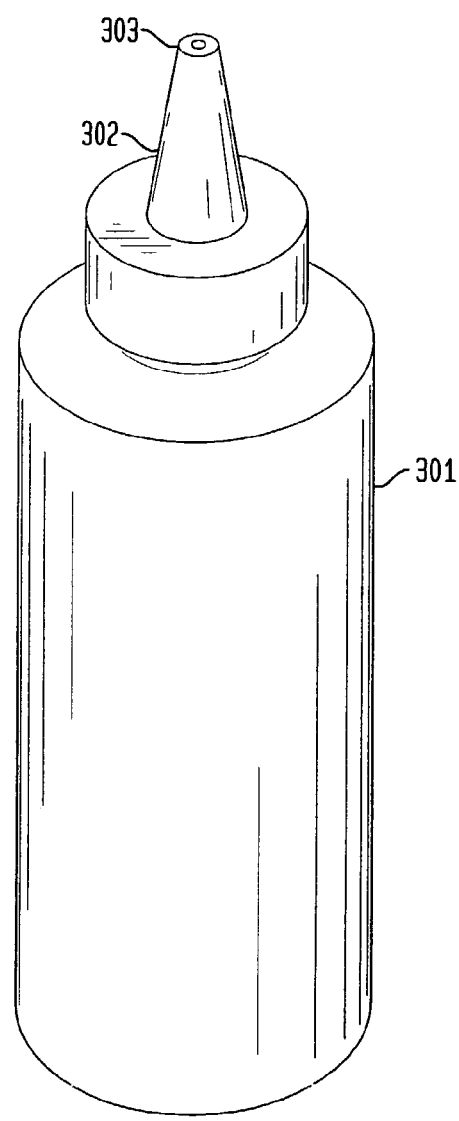

FIG. 4
FIG. 5
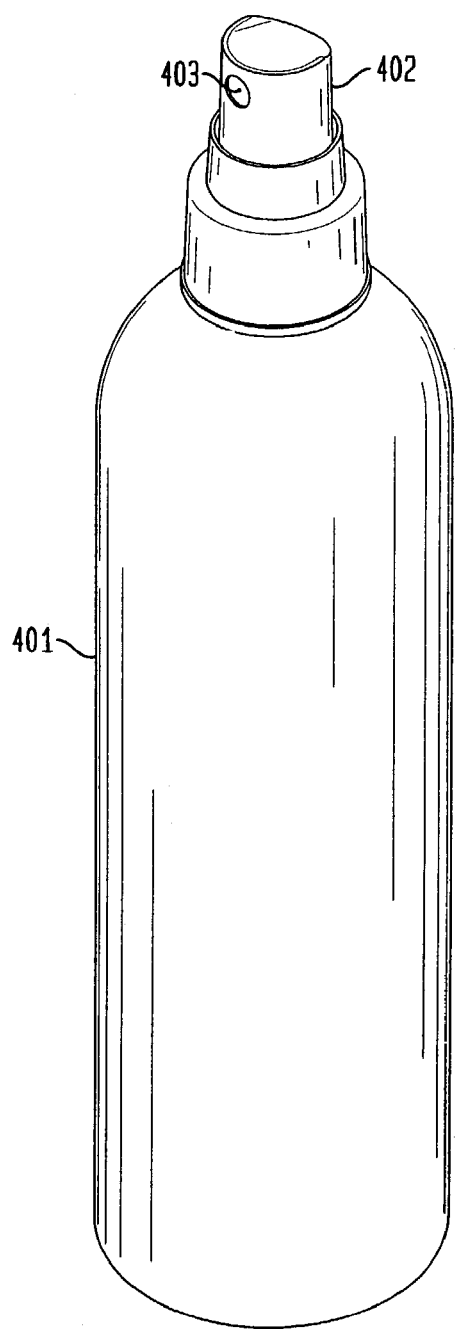
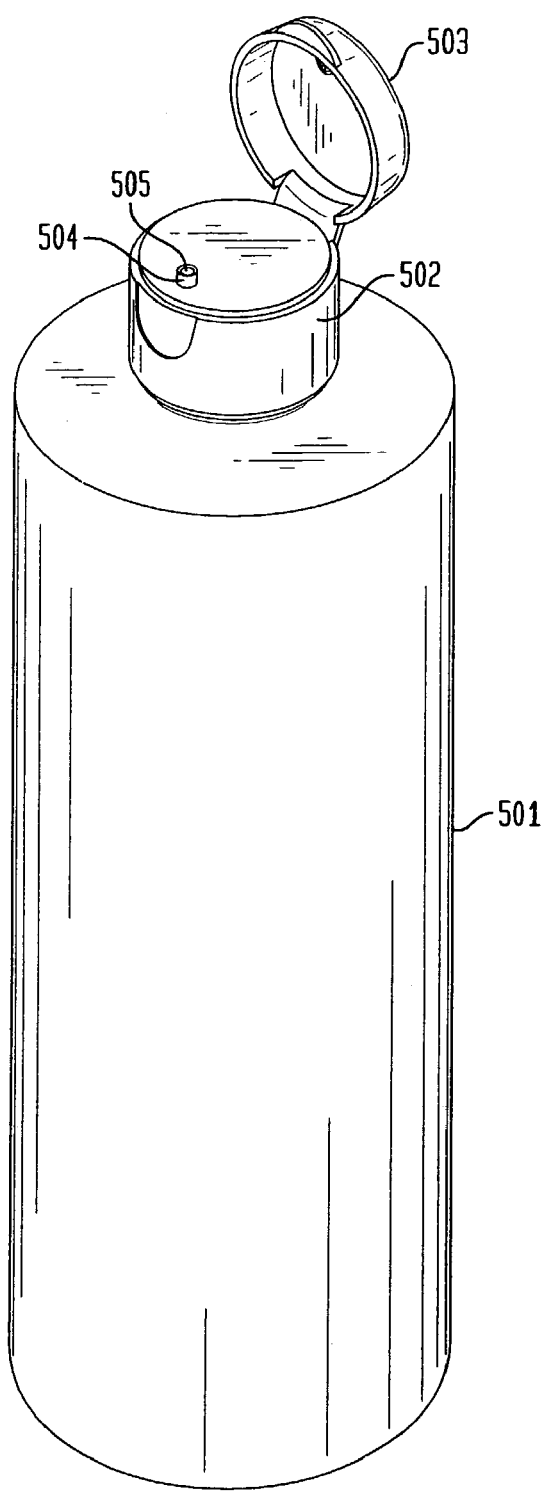

COOKING OIL ANTIOXIDANT COMPOSITION, METHOD OF PREPARATION AND USE

CROSS-REFERENCE TO RELATED APPLICATIONS

The present application claims benefit from Provisional Application No. 60/367,072 filed Mar. 22, 2002.

BACKGROUND OF THE INVENTION

Cooking processes utilizing cooking or frying oil at elevated temperatures can result in oxidation, hydrolysis and/or polymerization of the cooking oil. A review of the various deterioration reactions that occur in frying oils was discussed by C. W. Fritsch in World Conference on Soya Processing and Utilization, "Measurements of Frying Fat Deterioration: A Brief Review." Consequently such oils are susceptible to rapid degradation and the quality, nutritional profile and cooking performance of the oil quickly diminishes. Decomposition or degradation of cooking oil at frying temperatures tends to form free fatty acids and their derivatives, products of the oxidative degradation of fatty acids as well as polymers. The cooking oil also picks up particulates, soluble contaminants such as metal ions and leachates, e.g., food juices, from the food being fried. The presence of such materials in the cooking oil causes undesirable degraded frying properties and also may have a deleterious effect on taste and smell of the food. Specifically, the food fried in such degraded oil may be overcooked with a too dark finish (brown) on the outside before it is properly cooked on the inside. For example, it has been reported in U.S. Pat. No. 4,349,451 that cooking oil with as little as 12 ppm of substances resulting from food juices and/or the interaction of food juices with fatty acids has the undesirable tendency to foam or boil while cooking. In addition, with as little as 6 ppm of such contaminants, the used cooking oil tends to have oleophilic properties with food, thus leaving oily residue on the surface of the fried food product.

Various compositions and methods have been used in the past in order to maintain the quality of the cooking oil or to quickly and economically treat contaminated cooking oil, such as by introducing antioxidants into the contaminated cooking oil. See, e.g., U.S. Pat. Nos. 3,947,602; 4,330,564; 4,349,451; 4,462,915; 5,200,224; and 5,354,570 each incorporated herein to the extent permitted.

It is common in operation of fryers, particularly restaurant fryers, that there is a cycle of oil life from the time a fryer is filled with fresh oil until the oil is discarded as unsuitable for further use. The amounts of antioxidants that are present in the fresh cooking oil are rapidly depleted during heating and cooking at frying temperatures. Oxidation and other degradation reactions, including reactions that degrade the quality of the oil and/or the quality, including taste, smell and appearance, of food cooked in the oil, are amplified at these frequently used elevated frying temperatures. The amount of antioxidants present in fresh cooking oil is limited and inadequate to counteract the rate at which oxidative degradation reactions occur in hot cooking oil. If the amount of antioxidants were greater, the life of the cooking oil would be extended. However, the amount of antioxidants in frying oil is limited because natural oil soluble antioxidants, such as phytosterols, oryzanol, sesamolin, tocopherols and squalene, are generally present in low concentrations. Furthermore, many additive antioxidants potentially suitable for use with food, such as citric acid, ascorbic acid and rosemary extract, have very low solubility or they are insoluble in fresh oil. Therefore the concentration of such stable, non-toxic antioxidants that may be present in fresh oil is limited to low levels. For example, d-alpha tocopherol is added to rapeseed oil at less than 500 ppm and citric acid is used in corn oil and sunflower oil as a process aid at a concentration of 50 mg per kg of oil. Consequently, their presence at low concentrations results in their being quickly consumed when the oil is used at elevated temperatures thereby leaving the oil unprotected. Alternatively, prior methods for introducing such additives included additional components, e.g., mineral particulates, that users may need to filter out of the oil before it is returned to cooking or whose use the food processor may desire to avoid altogether. Other additive antioxidants such as butylated hydroxy anisole (BHA) butylated hydroxy toluene (BHT) and gallates such as propyl gallate, are limited as to the amount that safely can be added to fresh oil because of health concerns. Also, although antioxidant additives such as BHA and BHT are soluble in oil and stable at room temperature, they are unstable and degrade rapidly at cooking temperatures and/or offer minimal antioxidant effect at the elevated temperatures involved in cooking. Consequently, the amounts that may be used typically are limited to low concentrations required for maintaining oxidative stability while the oil is stored prior to use.

The cooking process at elevated temperatures depletes antioxidants in the oil so oxidative degradation progresses quickly. Typically, the addition of fresh cooking oil to used cooking oil introduces into the overall composition only the limited amount of additional antioxidants present in the fresh oil and this is insufficient to provide an acceptable stabilizing effect to the used cooking oil. In circumstances where large volumes of oil are removed from the fryer with the fried food, correspondingly large volumes of fresh oil are required to be added, thereby potentially avoiding excessive degradation of the oil in the fryer. However, other than cooking with essentially fresh oil all of the time, the quality problems described herein typically present problems to the food industry. This circumstance can arise, for example, in some high volume commercial food processor fryers. However, even in these circumstances, the addition of supplementary antioxidant(s) and additive(s) to the oil pursuant to the present disclosure can enhance the antioxidant composition in the oil as well as enhance its cooking performance and the quality of the foods cooked therein. Typically, the quantity of additional fresh oil added to fryers during cooking in restaurants and many retail food production facilities is sufficiently low so that the additional antioxidant from the addition of fresh oil is not sufficient to provide an acceptable stabilizing effect. The result is progressive degradation of the composition of the oil and its cooking performance. Conversely, if the antioxidants depleted by the cooking process can be easily replenished, then the progressive degradation of the oil is greatly inhibited. The resulting benefits can include reduced oil absorption by the cooked food, improved taste and improved shelf life of such food.

Frying studies reported in the literature typically employ test conditions that ignore the influence of food on the frying oil. Some natural constituents or food ingredients have a potential of slowing down the degradation of cooking oil. Water and food acids are common components present in food; in fact, some foods can contain up to 70% water. As reported by C. Gertz et al., studies were performed to simulate and assess the effect of various food components and additives on the stability of frying oils or fats at frying temperatures. In order to simulate the effect of food having been previously cooked in the oil, the presence of water and food acids was represented by the addition of acidic silica gel containing 5% and 10% water. In comparison to the blank (oil heated without food) the formation of deterioration products was reduced in the presence of the acidic silica gel. The polymerization of triglycerides was retarded by acid silica gel in the presence of water. European J. Lipid Sci. Technol. 102 (2000) 543–551, C. Gertz, S. Klostermann, S. P. Kochhar, "Testing and comparing oxidative stability of vegetable oils and fats at frying temperature."

U.S. Pat. No. 3,947,602 discloses a method for treating cooking oil with a food compatible acid. The method is said to increase the useful lifetime of the cooking oil. However, this method requires heat exchangers to prevent the circulated hot oil from heating the food acid solution to the boiling point. It also requires bulky apparatus and the use of a filter to accomplish the filtering step and thus incurs higher operating cost and capital investment.

U.S. Pat. Nos. 4,349,451 and 4,330,564 disclose a composition comprising water, food compatible acid and porous rhyolite or perlite carrier. This composition can be added directly to used hot cooking oil to remove or neutralize the effect of contaminants, such as soluble food juices and fatty acids in the used cooking oil, to increase its useful lifetime and cooking characteristics. However, it would be desirable to avoid the use of a mineral carrier, as described in these patents as well as in Gertz et al. above, particularly in some European nations where regulations may prohibit the presence of a mineral residue.

Similarly, U.S. Pat. No. 6,210,732B1 claims a cooking oil additive comprising a mixture of citric acid and synthetic amorphous precipitated calcium silicate wherein the mixture is added to heated cooking oil and the oil is subsequently filtered after use of the cooking oil for 6–8 hours. Filtration removes the added calcium silicate as well as food crumbs and other sediment.

U.S. Pat. No. 4,968,518 discloses a process of treating used cooking oil comprising contacting a portion of the used oil with an aqueous solution of a "regeneration agent," i.e., ethylenediamine tetraacetic acid or n-propyl-3,4,5-trihydrobenzoate, to obtain an oil water mixture and then separating the aqueous components from the oil to obtain a "regenerated" oil that can be returned to service.

A product identified as "Oil Master" was recently introduced to the European market and is said to provide the delivery of aqueous and nonaqueous ingredients by the use of oil as a carrier. It employs an oil soluble emulsifier in order to combine the aqueous ingredient(s) with the oil. The resulting emulsion is added to the used oil. However, this product and its method of delivery uses additional oil as a carrier to introduce the aqueous additive(s). This has the potential of introducing a carrier oil that may differ from oil in the fryer. Furthermore, the carrier oil adds an extra cost for making and distributing the product.

The compositions and methods discussed above as well as others have certain disadvantages. For example, compositions employing activated carbon as an absorbent are hard to filter thoroughly, making it difficult to remove the particles of activated carbon from treated oil with facilities normally available in a restaurant kitchen. Others use filter media and filtration equipment to slow degradation of oil with a filtering step. Others provide for the removal of impurities from the used cooking oil, but do not replenish antioxidants and water in the oil. Still others require long time periods for treatment, which make them economically disadvantageous. Therefore, it would be desirable to provide a composition to overcome these disadvantages by replenishing desirable antioxidant ingredients easily and cost effectively, which composition could be simply added periodically or continuously to hot cooking oil.

SUMMARY OF THE INVENTION

The first aspect of the invention is directed to a process of stabilizing hot cooking oil comprising (a) periodically introducing into hot cooking oil, for example, oil at a temperature in a range from about 225° F. to 350° F., an aqueous mixture, solution, suspension, dispersion or emulsion comprising at least one antioxidant, such as a food acid, or at least one such antioxidant in combination with at least one water-soluble or water-dispersible emulsifier. In a preferred embodiment, the composition further comprises at least one water-soluble or water dispersible emulsifier. Preferably, the aqueous antioxidant-containing composition is introduced to the cooking oil at least once during the period when the oil is used for cooking or frying and prior to the oil being discarded as unsuitable, e.g., due to taste, color and/or odor. Also preferably, the aqueous antioxidant-containing composition is introduced at a controlled rate comparable to that of the release of water from food fried in the hot cooking oil. Such controlled addition avoids or prevents explosive transformation of an aqueous component into steam. The addition of the composition can be correlated with one or more tests for detecting degradation of the fryer oil composition (e.g., using sensors for detecting one or more aspects of oil quality) and the rate of the addition can be adjusted to the rate of the oil degradation; this aspect of the invention contemplates the use of automated systems where appropriate sensors or detectors are used to monitor oil quality. In a particularly preferred embodiment, controlled addition of the composition is facilitated by the use of a device for introducing the composition into the hot oil as a fine stream, a mist, a fog, small diameter liquid droplets or as an aerated stream or small diameter droplets, using e.g., a hand-held sprayer.

The second aspect of the invention is directed to a composition comprising (a) minor concentration of an aqueous solution, dispersion, suspension or emulsion of at least one antioxidant, such as a food acid; or a solution, dispersion, suspension or emulsion of at least one antioxidant, such as a food acid, and at least one water-soluble or water-dispersible emulsifier and (b) a major concentration of a cooking oil. In preferred embodiments in which emulsifier is not employed, the concentration of food acid and/or herbal extract is present in the oil at the time of addition at about 0.003 wt. % to about 1 wt. %, preferably about 0.004 wt. % to about 0.6 wt. %, more preferably about 0.005 wt. % to about 0.06 wt. %, most preferably about 0.01 wt. % to about 0.04 wt. %. Provided that the length of time that the hot oil continues to be useful is sufficiently increased, still higher concentrations of the food acid and/or herbal extract can be used; limited experimentation including a cost-benefit analysis can be used to determine such increased concentrations. Typically, herbal extracts are used in combination with at least one food acid or food acid derivative so that useful concentrations of the herbal extract can be lower than that of the food acid or food acid and herbal extract combination. For example, considered by itself, a useful amount of the herbal extract is about 0.0005 wt. % to about 0.6 wt. %; preferably about 0.005 to about 0.06 wt. %. In preferred embodiments in which emulsifier is employed, the water-soluble or water-dispersible emulsifier is present in the oil at the time of addition at about 0.0000002 ($2 \times 10^{-7}$) wt. % to about 0.05 wt. %; preferably about $2 \times 10^{-6}$ wt. % to about 0.005 wt. %; and the food acid is present in the oil at the time of addition at about 0.003 wt. % to about 1 wt. %, preferably about 0.004 wt. % to about 0.6 wt. %, more preferably about 0.005 wt. % to about 0.06 wt. %. Reference to the "at the time of addition" means that the residual amount of additive in the hot oil can change after addition due to, e.g., vaporization, reaction, degradation, etc. The cooking oil is at a temperature in a range of from about 275° F. to 400° F., although the temperature at the low end of the range can about 225° F.; typically from about 300° F. to about 375° F. The composition comprising (a) and (b) can be in the form of a solution, dispersion, suspension, mixture or emulsion. When the compositions of the present invention, (a), are added to the cooking oil, antioxidant previously depleted from the cooking oil is fully or partially replenished by at least one added antioxidant. The composition also can be added at any time in order to supplement the antioxidant present in the cooking oil.

The third aspect of the invention is directed to a composition comprising (a) water, (b) at least one antioxidant, such as a food acid, and (c) at least one water-soluble or water-dispersible emulsifier. Typically, the composition can be prepared by mixing an antioxidant and water-soluble or water-dispersible emulsifier in water such that the mixture comprises about 5 wt. % to about 60 wt. %, preferably about 10 wt. % to about 40 wt. % antioxidant and about 0.00001 wt. % to about 5 wt. %, preferably about 0.0001 wt. % to about 2 wt. %, for example about 0.0005 to about 2 wt. % emulsifier.

The fourth aspect of the invention is directed to a composition comprising (a) at least one antioxidant, such as a food acid, and (b) at least one emulsifier.

BRIEF DESCRIPTION OF THE DRAWINGS

FIGS. 2, 3, 5 and 6 illustrate devices for introducing additives in the form of a fine stream.

FIGS. 4, 7, 8 and 9 illustrate devices for introducing additives in the form of a mist, fog and/or small diameter droplets.

DETAILED DESCRIPTION

Figure 1:
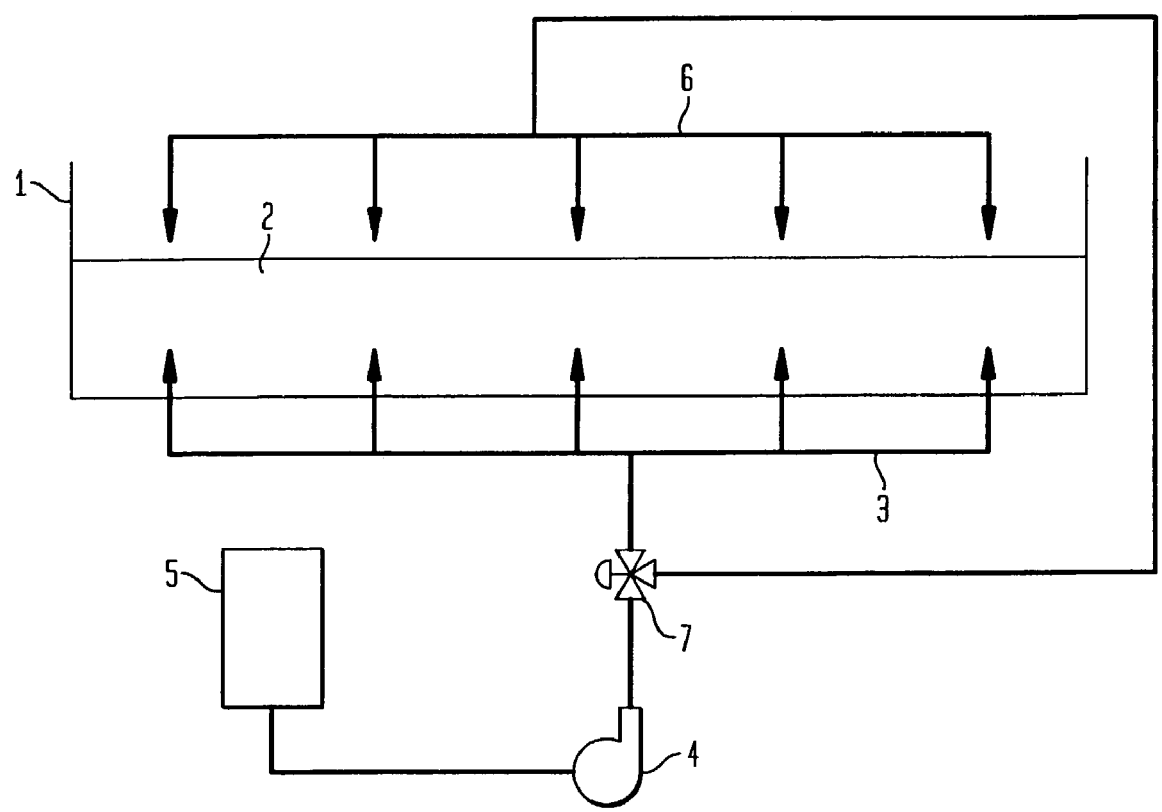
FIG. 1 illustrates a process for introducing additives at a controlled rate into a fryer containing oil.

For purposes of the present invention, an antioxidant is a compound, component or mixture of compounds or components, some of which are capable of reacting with free radicals to inhibit free radical chain reactions. Consequently, an antioxidant of the present invention has the effect of improving at least one chemical or physical characteristic of the oil upon exposure of the oil to elevated temperature, including, for example, the stability of the oil to oxidative degradation, inhibiting the formation of undesirable oxides and peroxides, inhibiting molecular weight reduction of the oil molecules, inhibiting formation of crosslinks in the oil that can lead to the presence of sludge, and inhibiting the formation of undesirable and/or unpleasant taste and odor bodies. Such antioxidants include natural and synthetic food acids and herbs, for example citric acid and rosemary extract, as well as other compounds and components identified herein and elsewhere in the art as exhibiting at least one of the above characteristics. Generally, useful herbs and herbal extracts include those such as turmeric, rosemary, oregano, sage, garlic, ginger, peppermint, purslane, bilberry, milk thistle, grape seed, green tea, maritime pine and St. John's wort (also known as hypericum). A useful listing can be found on the Internet at www.ars-grin.gov/duke/ comprising phytochemical and ethnobotanical databases maintained by Dr. J. Duke, incorporated herein by reference to the extent permitted. Therefore, in the context of the present invention, the use of an antioxidant stabilizes or improves the stability of hot oil used for cooking or frying in the sense that such oil can be used for a longer period of time before the quality of the oil or food cooked therein becomes unacceptable due to color, taste and/or odor. At least some of the benefits of the present invention are achieved by the addition of an aqueous composition, that is by the addition of water as a component. Although not wishing to be bound by theory, it is believed that the water of the composition, particularly in the form in which it is introduced according to the present invention, facilitates removal of volatile, odor forming species from used cooking oil, e.g., physically by a process analogous to steam distillation, or otherwise.

Compositions of the present invention comprising (a) water, and (b) at least one antioxidant, preferably a food acid, can typically be prepared by dissolving or dispersing the antioxidant in water. In a preferred embodiment, antioxidant is present in an amount of from about 5% to about 60% by weight, preferably from about 10% to about 40% by weight. More preferably, the composition, prior to addition to the oil, forms a solution, dispersion or suspension. The composition, upon addition to the cooking oil preferably forms a solution with the oil; alternatively, it forms a dispersion, a suspension or each of these conditions (solution, dispersion, suspension) can occur simultaneously to varying degrees.

Compositions of the present invention comprising (a) water, (b) at least one water-soluble or water-dispersible emulsifier, and (c) at least one antioxidant, preferably a food acid, can typically be prepared by dissolving or dispersing the emulsifier and antioxidant in water. In a preferred embodiment, the water-soluble or water-dispersible emulsifier is present in an amount of about 0.00001 wt. % to about 5 wt. %, preferably from about 0.0001 wt. % to about 2 wt. % and the antioxidant is present in an amount from about 5 wt. % to about 60 wt. %, preferably from about 10 wt. % to about 40 wt. %. In a preferred embodiment, the characteristics of the emulsifier include one or more of the following: nonionic, non-toxic regarding its suitability for human consumption, and low or non-foaming. More preferably, the composition, prior to addition to the oil, forms a solution, dispersion or a suspension. The composition, upon addition to the cooking oil disperses as a dilute emulsion. Forming an emulsion when the composition is introduced to the oil can be desirable since an emulsion enhances uniform dispersion of antioxidant ingredients and water throughout the cooking oil and prevents the coalescence of water droplets. This may aid in control of, or inhibit the rate of release of antioxidant composition. Generally, the cooking oil is at a temperature in a range from about 300° F. to 385° F. when the composition is added to the oil, and typically from about 325° F. to about 360° F.

Water-soluble or water dispersible emulsifiers are generally known in the art. Examples of water-soluble or water dispersible emulsifiers include, but are not limited to mono and diglycerides of fat forming fatty acids, carboxylic acids and fatty acids esters of glycerol. As used herein, "food acid" includes, but is not limited to citric acid, tartaric acid, malic acid, lactic acid, acetic acid, fumaric acid, ascorbic acid or Vitamin C, isoascorbic acid, succinic acid, adipic acid, hydrochloric acid, and phosphoric acid, as well as glycerol esters of the above listed acids, ethylenediamine tetraacetic acid and fatty acids as well as permutations, combinations and mixtures thereof. The composition optionally further comprises a food compatible agent, such as acetic acid and/or chelating agent that reduces the hardness of the water, as the use of hard water can be counterproductive to inhibiting degradation reactions in the cooking oil. Alternatively, demineralized water, or water with reduced concentrations of minerals, can be used. Compositions of the present invention preferably comprise at least one antioxidant selected from the group consisting of citric acid, ascorbic acid, ascorbyl palmitate and natural antioxidants derived from the turmeric or rosemary.

Advantages of the present invention are achieved by adding a minor concentration of a composition of the present invention, for example, (a) a composition comprising a minor concentration of at least one water soluble or water dispersible antioxidant which may be a food acid, water and, optionally, at least one water-soluble or water dispersible emulsifier, and (b) introducing the composition into a major concentration of a cooking oil. In a particularly preferred embodiment, the cooking oil is at a temperature in a range of from about 315° F. to about 360° F. The aqueous composition is preferably introduced into cooking oil without using either a solid mineral carrier or a liquid oil carrier. The mixture is more preferably introduced into the cooking oil at a slow, controlled rate over a period of time so as not to create a hazard by rapidly converting the liquid water to steam. This is achieved by controlling the rate of introduction of the aqueous composition to that comparable to the dehydration and migration of water from the surface of food cooking or frying in hot oil. All food contains water. Generally, foods contain about 40% to about 70% water. Supplementary water and antioxidants may be added by choice of an appropriate physical device for introduction of aqueous composition. The composition may be added as a fine spray or mist over the surface of the oil or by a single or multiple orifices so introduction of the composition causes an acceptable level of effervescence without splattering hazard.

The aqueous composition may be added to the oil in a fine stream, preferably as a fog or mist of liquid droplets; such droplets or stream are preferably aerated. When added in the form of droplets, the size of the droplets is typically about 0.1 mm diameter to about 3.0 mm diameter; preferably from about 0.5 mm to about 2.5 mm. Alternatively, a fine stream of the composition can be about 0.05 mm to about 6 mm in diameter; preferably about 1 mm to about 2 mm. The aqueous composition can be introduced into or onto the surface of the oil using various application devices. For example, it is convenient to use containers such as plastic squeeze bottles that are equipped with covers or caps that are capable of generating a fine stream or mist when the bottle is squeezed. Such containers are well known. Alternatively, application containers can be hand held containers of the type that generate a fine mist or fog based on the use of a dip tube, spray nozzle and squeeze handle that draws the liquid from the container and forces it through the nozzle when the user squeezes or depresses the handle. Furthermore, containers that utilize a pump dispenser can be employed as well as syringes equipped with a fine bore capillary, needle or tube. These and other convenient containers, devices and methods for dispensing a fine stream, mist or fog are similarly well known in the art and can be selected by the artisan based on such factors as cost and convenience. The applicator device, including nozzle configuration, is preferably selected so as to generate an aerated liquid stream and/or aerated liquid particles or droplets. Such an applicator is available from Delta Manufacturing (PA). In circumstances where it may be desirable to limit the amount of air introduced into the oil, e.g., a commercial frying operation conducted for extended periods at elevated temperature, inert gas such as nitrogen, carbon dioxide or mixtures thereof, can be used in place of or in combination with air. Consequently, for purposes of the present invention, the term aeration should be understood to refer to the incorporation of small bubbles of a gas in a liquid droplet or stream where the gas can be air or an inert gas or mixtures thereof. Preferably, the composition is applied as a conical shaped spray of appropriate size droplets deposited on the surface of the hot oil over a wide area, for example an oval or circular shape having a major diameter of from about 3 inches to about 9 inches. Preferably, the area covered by the spray or mist is in a circular pattern about 5 inches in diameter or an oval pattern about 5 inches by about 9 inches. Alternatively, the mist or fog is sprayed above the surface of the fryer so that it covers from about 15% to about 70% of the surface area of the fryer; for example, from about 30% to about 50%. The specific area covered is not considered to be critical, provided that the composition reaches the surface of the oil and is carried into the overall oil composition.

A further alternative embodiment or method of applying the composition to the oil, particularly preferred for use with large frying equipment, such as used by manufacturers of cooked food products, is illustrated in FIG. 1. In this embodiment, the composition may be introduced from a reservoir (5) containing the composition through strategically placed multiple orifices beneath (3) and/or above (6) the surface of the oil by use of a control valve (7) in order to introduce a stream or a "fog" or a mist of small droplets of about 0.1 mm diameter to about 3.0 mm diameter, for example, about 0.5 mm to about 2.5 mm diameter. Preferably the composition is introduced below the surface of the oil as, for example, droplets having preferred sizes of from about 1.0 mm to about 1.5 mm diameter. The rate of addition of the composition can be controlled, for example, by the use of a metering pump (4). This is preferably accomplished at fixed intervals of time, for example, after the oil is at elevated or cooking temperature, after fixed intervals of cooking or as determined by periodic measurement of oil properties and/or visual observation of food appearance and internal temperature of the food (cooking performance of the oil). The rate of introduction may be varied by a review of the measured or observed properties of the oil and the food. The metering input of the composition may also be varied automatically by sensing key properties of the oil such as free fatty acids (FFA), peroxide or polar content. Such time intervals are conveniently selected by those skilled in the field of cooking, and particularly in the field of preparing fried foods, after limited experimentation or experience using the methods taught herein. Consequently, the amount of aqueous antioxidant composition comprising, for example, at least one food acid and/or at least one herbal extract and water can be added in an amount that compensates for the loss of or degradation of antioxidant that occurs over the selected time period or to adjust the quality of the cooking oil composition to a predetermined value of a test measurement carried out by an automated or manual test result.

The composition of the present invention comprising at least one antioxidant, e.g., food acid, and water, and, optionally, at least one emulsifier, can be prepared by mixing, such mixing optionally comprising processes such as solubilizing, dispersing or suspending, the recited components, and other optional, beneficial cooking oil additive(s) with one another. The mixing sequence is not critical and an appropriate operation can be determined with limited experimentation. Emulsifiers are generally known in the art. For purposes of the present invention, emulsifiers include both oil-soluble and water-soluble or water-dispersible emulsifiers. In carrying out this aspect of the invention, the antioxidant, e.g., food acid, additive in liquid or particulate form is dispersed or dissolved in the water or emulsifier/water mixture and the mixture is delivered to the hot cooking oil. Examples of such emulsifiers include, but are not limited to mono and diglycerides of fat forming fatty acids and/or other food compatible acids, and ascorbyl palmitate. In a particularly preferred embodiment, the emulsifier is selected from the group consisting of water-soluble or water-dispersible and oil-soluble emulsifiers and the antioxidant additive is in a form selected from the group consisting of solid particulates, liquids, aqueous solutions and aqueous dispersions. The antioxidant additives include antioxidant food acids described above as well as other antioxidants such as glycerol ester of citric acid and fat forming fatty acids derived from sunflower oil or canola oil, ascorbic acid, ascorbyl palmitate, turmeric and rosemary extract. In a particularly preferred embodiment ascorbyl palmitate is used, alone or in combination with other antioxidants and/or emulsifiers, in order to take advantage of both its antioxidant and emulsifier characteristics. Useful food additive materials also exhibiting both antioxidant and emulsifier characteristics include citric acid and fatty acid esters of glycerol; sodium, potassium and calcium lactates; sodium and potassium tartrates; sodium, calcium and potassium citrates; sodium, potassium, calcium, ammonium and magnesium phosphates; and lecithin. Consequently, such materials can be used alone in order to provide both antioxidant and emulsifier characteristics or they can be used in combination with other antioxidant and emulsifier materials already described in order to enhance the performance of the compositions. Furthermore, such dual function materials can be used in combination or mixture with one another.

The process of reducing the rate of oil degradation reactions or stabilizing the composition of hot cooking oil is preferably performed by controlling the rate of introduction of the solutions, dispersions, slurries or suspensions of the antioxidants and/or other beneficial food additive, e.g. water, food acid, or other antioxidant or emulsifier additives, aqueous or nonaqueous, into the hot cooking oil. The rate is preferably one that permits and enhances safe dispersion and diffusion, more preferably without the use of supplementary "foreign" carrier materials such as porous minerals or oil emulsions. In a preferred example, a water soluble antioxidant solution may be furnished as a safe "concentrated additive solution" to reduce shipping and packaging costs in contrast to a product using oil or porous mineral as a delivery carrier. When the compositions of the present invention are added to the cooking oil, antioxidant previously depleted from the cooking oil is replenished fully or partially by at least one added antioxidant. The compositions also can be added in order to supplement at any time the antioxidant present in the cooking oil.

Figure 6:
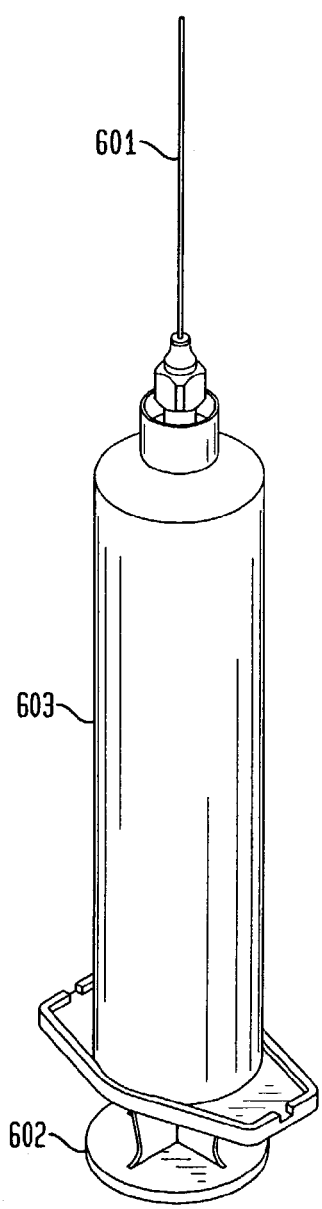
Figure 7:
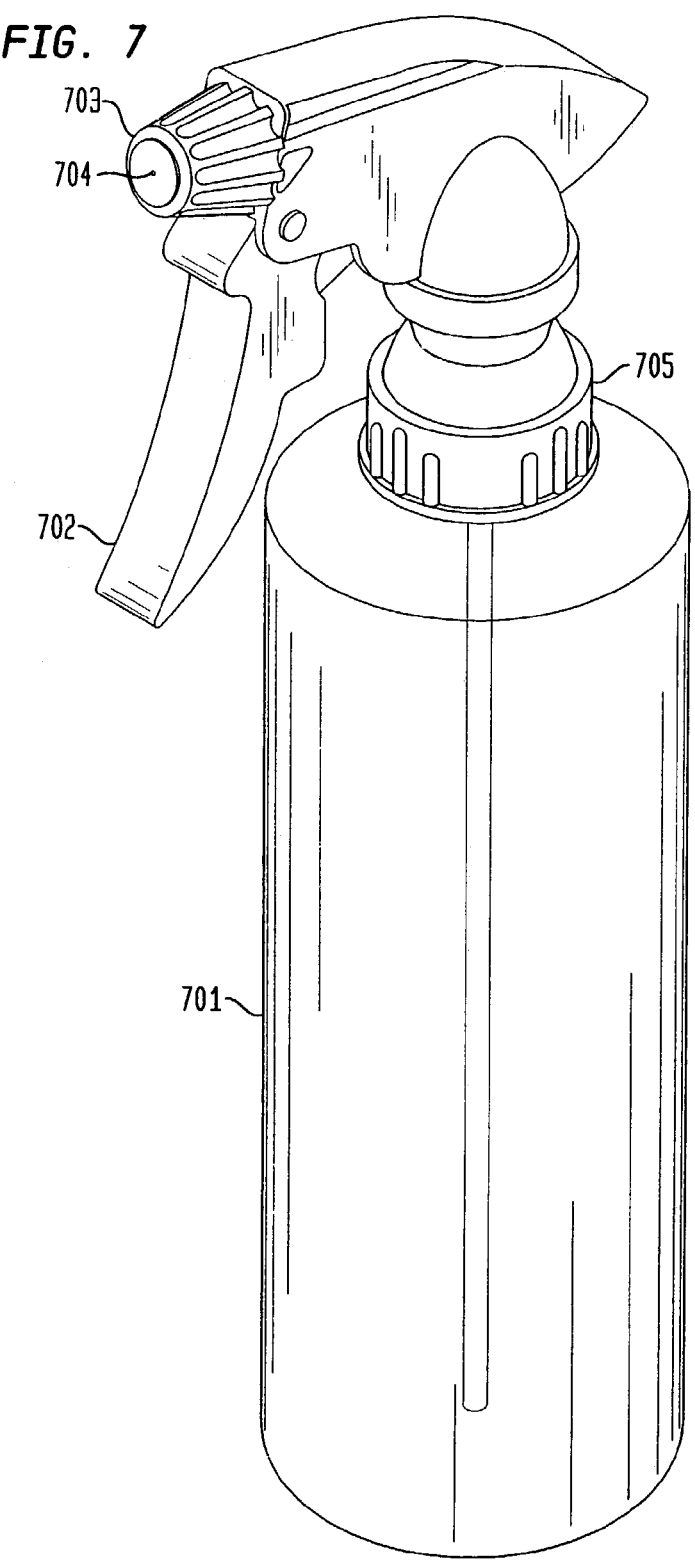
Figure 8:
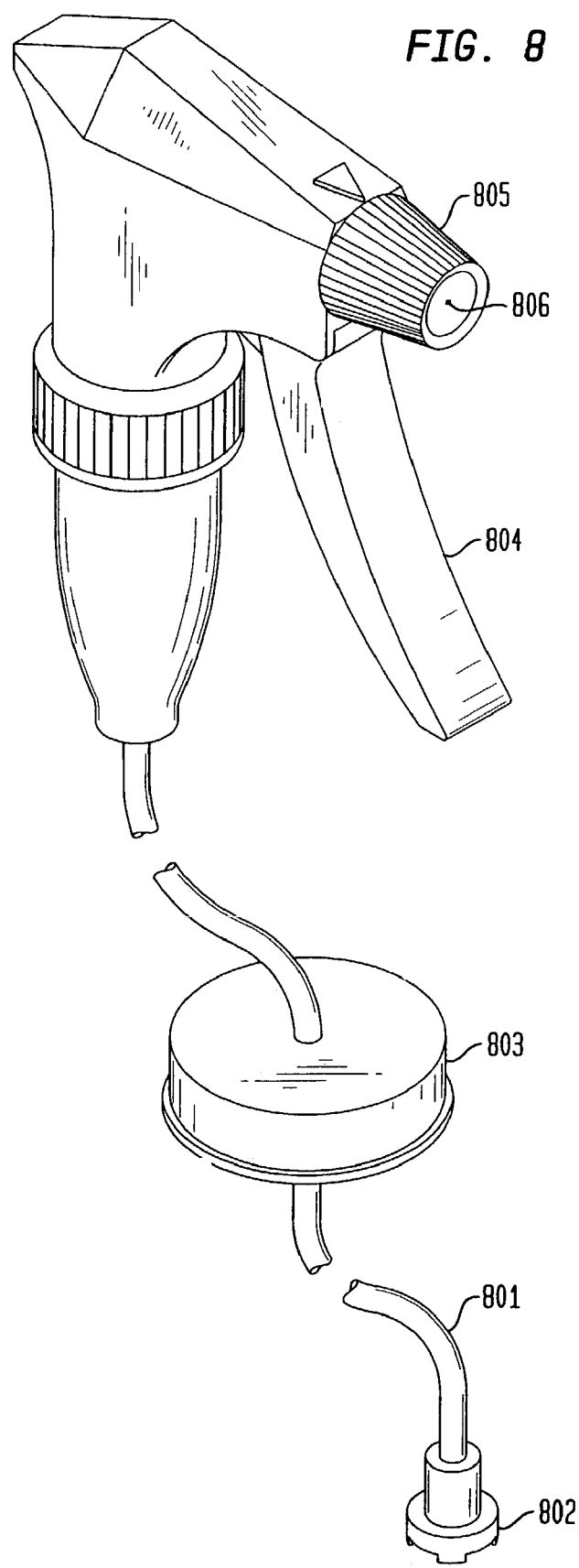
Figure 9:
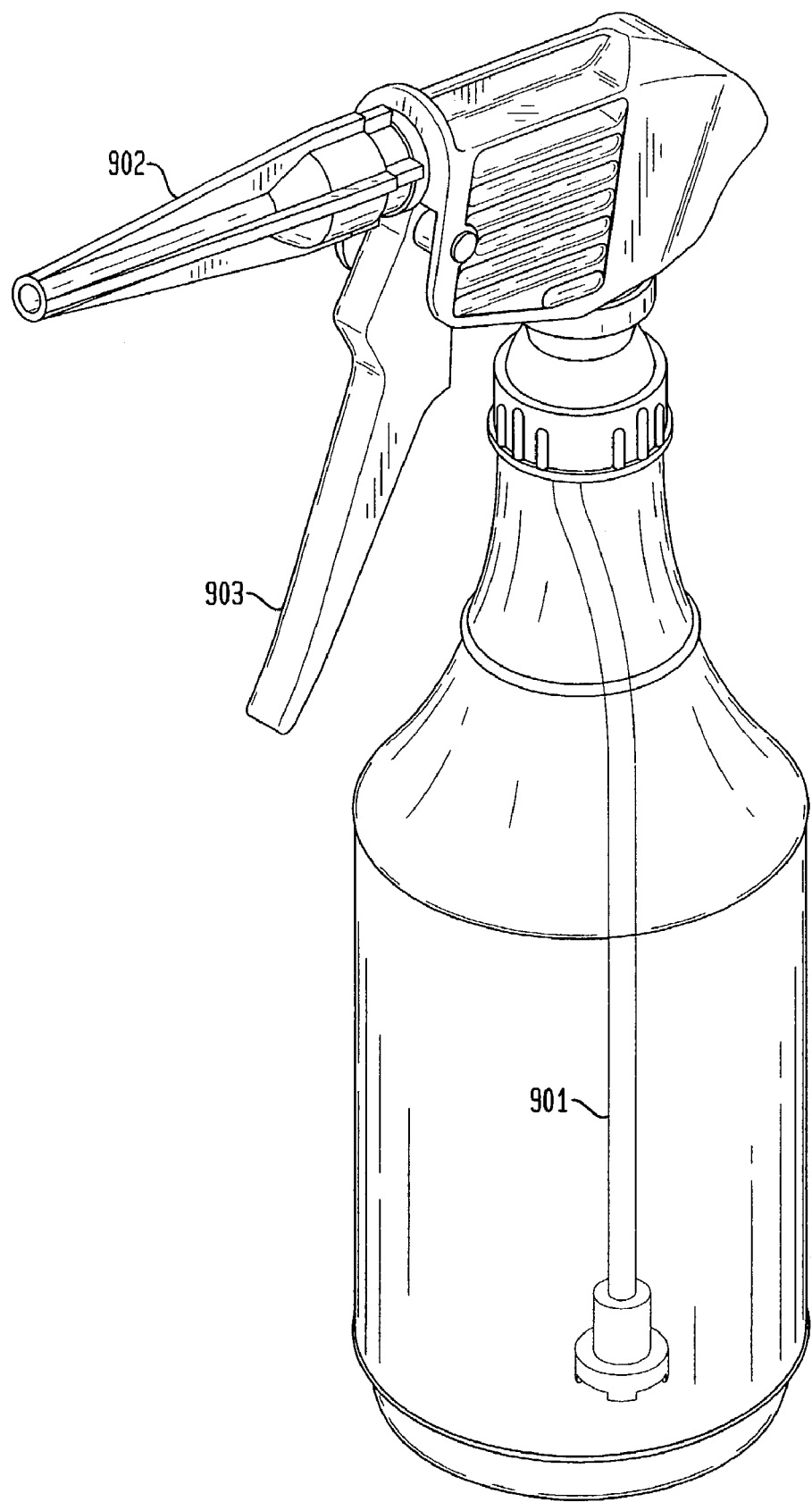

The compositions of the present invention can be effectively delivered to the hot cooking oil by various methods. Such methods are applicable to restaurant fryers as well as factory process fryers. For example, the composition containing a food acid, antioxidant and other additive can be delivered to the hot cooking oil using a fine bore or narrow diameter pipe or line. Various devices for delivering the composition of the present invention are illustrated in FIGS. 1–8. Devices for delivering a fine stream include, e.g., the squeeze bottles of FIGS. 2, 3 and 5, each including a small diameter opening through which the composition is delivered. A hypodermic syringe as illustrated in FIG. 6, or small diameter tubing with an appropriate limiting discharge orifice, from which the composition can be delivered onto and/or under the surface of the oil. Alternatively, other dispersion or delivery devices comprising a pump or trigger mechanism in combination with a fine orifice or spray nozzle may be used to introduce the compositions of the present invention into the hot oil, such as in the form of a spray or a fine stream, as small diameter droplets, a fog or a "mist" of the additive solution over the surface of hot oil; see FIGS. 4, 7 and 8. Referring to FIG. 2, 201 is a squeeze bottle, 202 the cap and 203 tip, including small diameter exit hole 204 from which the composition exits when it is extended up from the retracted position in the surface, as illustrated, to about a vertical or 90° position relative to the cap surface. Referring to FIG. 3, 301 is a squeeze bottle, 302 a protrusion or tip that is integral with the bottle cap and 303 a small diameter opening from which the composition exits the bottle when the bottle is squeezed; typically, the bottle cap includes a removable cover for the tip in order to seal it when the bottle is not in use. FIG. 4 illustrates a pump-type dispenser bottle 401 wherein when the pump mechanism 402 is depressed, the liquid within the bottle is drawn up through a dip tube (not shown) connected to the pump mechanism and exits through a small diameter orifice 403 in the form of a fog, mist or as small droplets, depending on the diameter or configuration of the orifice. FIG. 5 is a squeeze bottle 501 in which the cap 502 includes an integral cover 503 that, when open, reveals a protrusion 504 and small diameter exit orifice 505. FIG. 6 is a typical hypodermic syringe comprising a small diameter needle or extension 601 from which the composition exits when the plunger 602 is depressed within the body of the syringe 603. If desired, the body of the syringe can be volumetrically calibrated to facilitate use of desired amount of the composition with each depression of the plunger. Additionally, the syringe can be refilled from a supply of the composition. Similarly, calibration and the ability to be refilled are characteristics that are common to each of the devices for adding the composition of the present invention to the hot oil. FIG. 7 illustrates a squeeze-type spray device including a squeeze handle mechanism 702 in which a dip tube (not shown) is connected, typically press-fit, internally to the spray head mechanism within the bottle 701. The composition exits the device through the small diameter opening 704 in the adjustable flow control cap 703. The squeeze handle mechanism, including the dip tube, is separable from the bottle and typically is attached to it by a screw cap 705. A universal dip tube and spray mechanism is illustrated in FIG. 8. The dip tube includes a filter 802 at the pickup end of the tube 801; the tube passes through a cap 803 that can be attached to the composition reservoir by, e.g., a snap or screw fit. As in mechanisms of this type, when the handle 804 is squeezed, it creates a vacuum in the reservoir or bottle resulting in fluid being drawn up the dip tube from which it exits through the adjustable nozzle 805 at the orifice 806. Adjustment of the nozzle opening allows the composition to exit in the form of a fine mist or fog, as small droplets or in the form of a fine stream. An alternative sprayer illustrated in FIG. 9 comprises a dip tube 901, spray nozzle 902 and squeeze handle 903 arrangement similar to that in FIG. 7. As in the device illustrated in FIG. 7, the spray head mechanism is adjustable by rotating the nozzle clockwise or counterclockwise to obtain more or less of a fine stream. Additionally, the device illustrated in FIG. 9 also introduces aeration, the extent of which is adjustable by similar rotation of the spray head nozzle.

Still alternatively, the additive solution, dispersion or concentrate may be introduced continuously, intermittently or at fixed or regular intervals from a storage container where the introduction tube is fixed at a safe point in the fryer and the flow rate is set to meet the needs of the cooking demand during the day. For example, dispersion and diffusion of the aqueous food acid solution into hot cooking oil can take the form of a metering pump with volume and/or time control to introduce the fluid through a manifold containing orifices located beneath, and/or above, the surface of the oil. Furthermore, sensors can be used to continuously monitor the technical condition of the oil, e.g., according to polymerized triglycerides content, polar content, free fatty acid level or peroxide level. Various tests to measure oil quality are disclosed in the article by C. Gertz, et al., in the European J. Lipid Sci. Technol. cited hereinabove as well as in U.S. Pat. Nos. 4,349,353 and 4,731,332. Commercial versions of the tests referred to in the latter patents are available from MirOil Division of Oil Process Systems Inc. (Allentown, Pa.). These references, including descriptions of various test methods, are incorporated by reference to the extent permitted. An oil quality sensor to dispense and disperse the additive composition to the oil may activate the metering pump. The use of an emulsifier in the composition of the present invention further facilitates efficient dispersion of the composition upon contact with the hot cooking oil, such that the water present in the composition is effectively dispersed so that when it is converted to steam the water droplets are small enough to avoid dangerous splattering of the hot oil.

For purposes of the present invention, it is preferred that the aqueous antioxidant food acid or additive should be used in hot cooking oil, e.g., at or above about 250° F., more preferably at or above about 275° F., still more preferably, the oil temperature is about 300° F. to about 375° F., still more preferably about 315° F. to about 360° F. If the oil is not sufficiently hot, the aqueous composition can sink to a "cold zone" at the bottom of the fryer and remain in the form of a warm water composition that is not hot enough to change the water to steam in order to facilitate dispersion and/or diffusion of the water in the aqueous composition and its constituent ingredients into the cooking oil. Generally, cooking oils are triglycerides, i.e., the esterification product of glycerol with three molecules of saturated, unsaturated, or a mix of saturated and unsaturated carboxylic acids. Preferably, the cooking oils include vegetable derived, animal derived, and marine source derived fats and fatty oils that are liquids at the particular temperature that is necessary for the desired cooking effect. Examples of vegetable oil include canola oil, coconut oil, comgerm oil, cotton seed oil, olive oil, palm oil, peanut oil, rapeseed oil, safflower oil, sesame seed oil, soy bean oil, sunflower oil or mixtures thereof. Examples of animal derived oil include lard and tallow (e.g., beef, sheep fat). Cooking oil also includes any mixture of the vegetable derived, animal derived, and marine source derived fats.

EXAMPLE

A test of the present invention was conducted in which an aqueous composition containing 20 wt. % antioxidant was sprayed into hot, used cooking oil that had degraded to the point of having an undesirable odor. Immediately upon contact of the composition spray with the hot cooking oil a "froth" or boiling effect was observed, but undesirable splattering of the hot oil did not occur. The composition was added to the cooking oil from above the surface of the oil using a squeeze handle type spray device of the type illustrated in FIG. 9, thereby introducing the composition in the form of small diameter aerated droplets. After the oil became quiescent, the cooking odor previously present was no longer noticeable. The composition continued to be applied at approximately 6 hour intervals, thereby appreciably extending the useful life of the cooking oil.

Various publications, including research reports and the patents, are cited throughout the present application and the contents of these publications, as well as the documents cited in these publications are incorporated herein by reference to the extent permitted.

Furthermore, any range of numbers recited in the specification or paragraphs hereinafter describing various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. The term "about" when used as a modifier for, or in conjunction with, a variable, is intended to convey that the numbers and ranges disclosed herein are flexible and that practice of the present invention by those skilled in the art using temperatures, concentrations, amounts, contents, carbon numbers, properties such as particle size, surface area, diameter, volume, bulk density, etc., that are outside of the range or different from a single value, will achieve the desired result, namely, provide an additive and the ability to deliver it to hot oil in order to improve the stability and performance of the oil for frying foods at elevated temperature.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the summary of the invention or the appended claims.

What is claimed is:

1. A process comprising periodically introducing into hot cooking oil at cooking temperatures a composition comprising water and a mixture of antioxidants, wherein: (A) said mixture comprises (1) at least one dual-function additive exhibiting both antioxidant and emulsifier properties and (2) at least one herb or herbal extract; and (B) provided said composition does not include a particulate mineral carrier; said process thereby stabilizing said hot cooking oil.

2. The process of claim 1 wherein said dual-function additive is selected from the group consisting of ascorbyl palmitate, citric acid, fatty acid esters of glycerol; sodium lactate, potassium lactate, calcium lactate, sodium tartrate, potassium tartrate, sodium citrate, calcium citrate, potassium citrate, sodium phosphate, potassium phosphate, calcium phosphate, ammonium phosphate, magnesium phosphate, lecithin and mixtures thereof.

3. The process of claim 1 wherein said at least one herb or herbal extract is selected from the group consisting of turmeric, rosemary, oregano, sage, garlic, ginger, peppermint, purslane, bilberry, milk thistle, grape seed, green tea, maritime pine and St. John's wort.

4. The process of claim 3 wherein said at least one herb or herbal extract is selected from the group consisting of turmeric and rosemary.

5. The process of claim 1 wherein said composition further comprises a water-soluble or water-dispersible emulsifier.

6. The process of claim 5 wherein said emulsifier is non-ionic.

7. The process of claim 5 wherein said composition comprises up to about 5 wt. % emulsifier.

8. The process of claim 5 wherein said composition comprises about 0.0001 wt. % to about 5 wt. % emulsifier.

9. The process of claim 1 wherein the temperature of said hot oil is about 225°F. to about 400°F.

10. The process of claim 1 wherein in the introduction of said composition is at a controlled rate such that the aqueous component is not explosively transformed into steam.

11. The process of claim 10 wherein said composition is introduced in a form selected from the group consisting of a fine stream, a mist, a fog, small diameter liquid droplets, an aerated stream and aerated small diameter droplets.

12. The process of claim 11 wherein aeration is accomplished by incorporation of air or an inert gas.

13. The process of claim 12 wherein said composition is introduced, relative to the top surface of said hot oil, from at least one of the following: above; below; and above and below.

14. The process of claim 13 wherein said composition is introduced from below said top surface of said hot oil through at least one injection orifice.

15. The process of claim 14 wherein said composition is introduced from above the top surface of said hot oil through at least one orifice in communication with a reservoir comprising said composition.

16. The process according to claim 15 wherein said reservoir comprises a hand held container capable of delivering a liquid stream or spray.

17. The process of claim 16 wherein said hand held container comprises a squeeze bottle including an orifice for producing a liquid stream or spray.

18. The process of claim 15 wherein said hand held container comprises a pump or trigger mechanism in combination with a fine orifice or spray nozzle.

19. The process of claim 1 wherein said periodic introduction is correlated with at least one oil quality test.

20. The process of claim 19 wherein said test is selected from the group consisting of polymerized triglycerides content, polar compounds content, free fatty acid level, peroxide level, taste, odor and color.

21. The process of claim 19 wherein said composition is introduced using an automated system.

22. The process of claim 1 wherein said composition is introduced at a rate or in an amount, or both, corresponding to the rate or extent of degradation of said oil.

23. The process of claim 1 wherein said water has a reduced concentration of minerals therein.

24. The process of claim 1 wherein said dual-function additive is a food acid derivative.

* * * * *

UNITED STATES PATENT AND TRADEMARK OFFICE
CERTIFICATE OF CORRECTION

PATENT NO. : 7,320,809 B2  
APPLICATION NO. : 10/395314  
DATED : January 22, 2008  
INVENTOR(S) : Bernard Friedman and Barbara A. Bielska It is certified that error appears in the above-identified patent and that said Letters Patent is hereby corrected as shown below:

On the title page item (73), Assignee, "Processing" should read --Process--.
At column 1, line 21, "diminishes" should read --diminish--.
At column 1, line 61, "were" should read --was--.
At column 2, line 16, insert --,-- after the word "gallates".
At column 3, line 50, "uses" should read --use--.
At column 6, line 52, insert --,-- after third occurrence of the word "of".
At column 6, line 62, insert --,-- after the word "to".
At column 7, line 53, "hand held" should read --hand-held--.
At column 8, line 10, "conical shaped" should read --conical-shaped--.
At column 9, line 9, insert --,-- after the word "to".
At column 13, line 15, delete the word "in".
At column 14, line 6, "hand held" should read --hand-held--.
At column 14, line 8, "hand held" should read --hand-held--.
At column 14, line 11, "hand held" should read --hand-held--.

Signed and Sealed this

Seventeenth Day of June, 2008

JON W. DUDAS  
*Director of the United States Patent and Trademark Office*